April 7, 1925.   1,532,686
S. H. CORFIELD
APPARATUS FOR THE DISTILLATION OF MATERIALS
Filed Jan. 10, 1924   2 Sheets-Sheet 1

Inventor.
Stephen Henry Corfield
By Booth & Booth
Attorneys.

April 7, 1925. 1,532,686
S. H. CORFIELD
APPARATUS FOR THE DISTILLATION OF MATERIALS
Filed Jan. 10, 1924 2 Sheets-Sheet 2
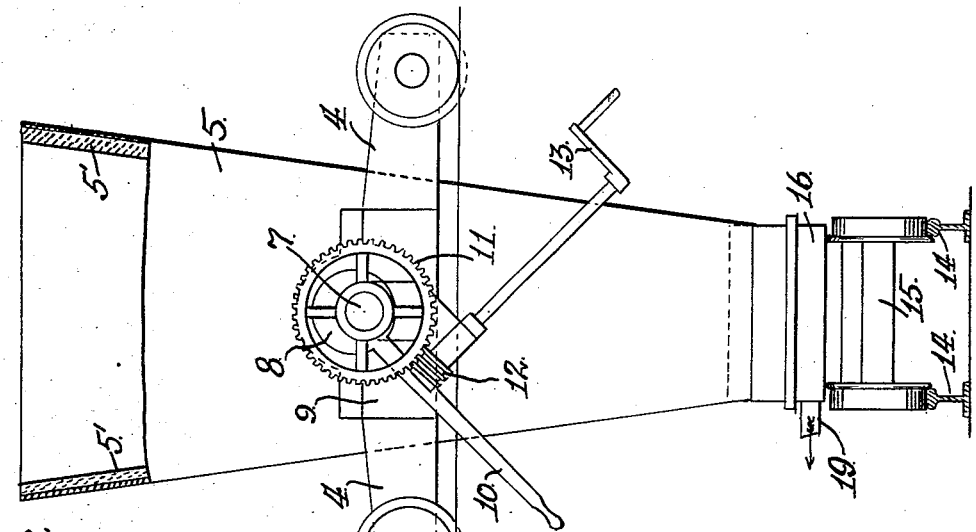
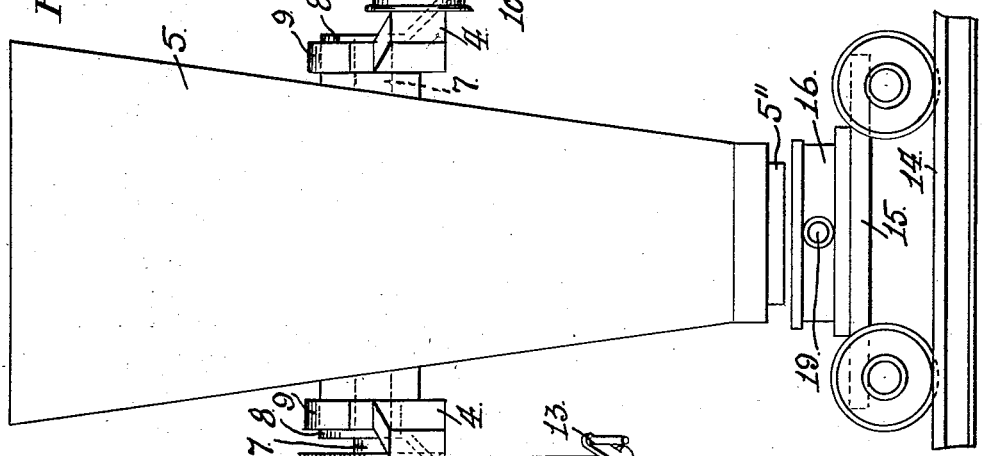
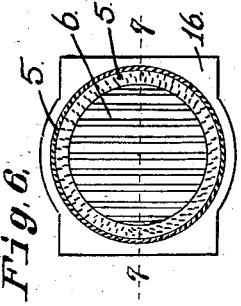
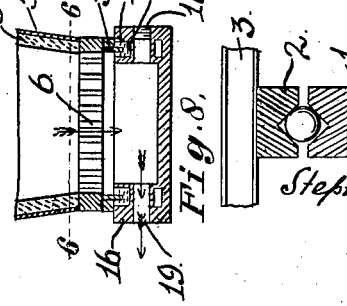
Inventor.
Stephen Henry Corfield
By Booth & Booth
Attorneys.

Patented Apr. 7, 1925.

1,532,686

UNITED STATES PATENT OFFICE.

STEPHEN HENRY CORFIELD, OF SANTA MARIA, CALIFORNIA, ASSIGNOR TO DISTILLATION PRODUCTS CO., OF PHOENIX, ARIZONA, A CORPORATION OF ARIZONA.

APPARATUS FOR THE DISTILLATION OF MATERIALS.

Application filed January 10, 1924. Serial No. 685,293.

*To all whom it may concern:*

Be it known that I, STEPHEN HENRY CORFIELD, a citizen of the United States, residing at Santa Maria, in the county of Santa Barbara and State of California, have invented certain new and useful Improvements in Apparatus for the Distillation of Materials, of which the following is a specification.

My invention relates generally to the distilling art, and particularly to that form or method of simple or destructive distillation in which the material placed in the treating or distillation vessel is ignited at and burns downwardly from the top, a combustion-supporting medium being passed through the material from the top downwardly, whereby the combustion zone travels downwardly and the distilled products are carried off from below.

My invention is adapted for distilling materials which in and of themselves or in suitable mixtures are, under proper conditions, combustible. This invention is therefore, applicable for treating a great variety of materials, amongst which, for example, I may enumerate, wood and wood products, for the production of charcoal, wood oils, resins and the like; coal, for the production of tars, oils, gases, coke, and the like; earths bearing commercial values, for the production of lime, calcined diatomaceous products, sulphur, oil from shales, and the like; vegetable matter for producing alcohol, fertilizers and the like; and animal matter for the production of oils, bone-black, and the like.

The object of my invention is to provide a simple and effective apparatus for this purpose, adapted particularly for rapid and effective work; and further by reason of its capability of embodiment in the form of an annular series of treating or distillation vessels, or containers traveling in an endless path, is of great capacity, and is easily and economically operated.

To this end my invention consists in the novel apparatus for the described purpose, which I shall hereinafter fully describe, by reference to the accompanying drawings, it being understood that changes, modifications in structural details and arrangement of the apparatus may be made without departing from the spirit of the invention as herein disclosed and pointed out in the claims.

In the drawings—

Fig. 4 is a front elevation enlarged, of one of the treating containers, showing it lifted from its communicative association with its chambered base-member.

Fig. 5 is a side elevation of the container showing it lowered to its association with its chambered base-member.

Fig. 6 is a cross section on the line 6—6 of Fig. 7 through the lower portion of the treating container above the plane of the grate in the lower end of said container.

Fig. 7 is a vertical sectional detail on the line 7—7 of Fig. 6.

Fig. 8 is a vertical cross-sectional detail of the turn-table race.

Figure 1:
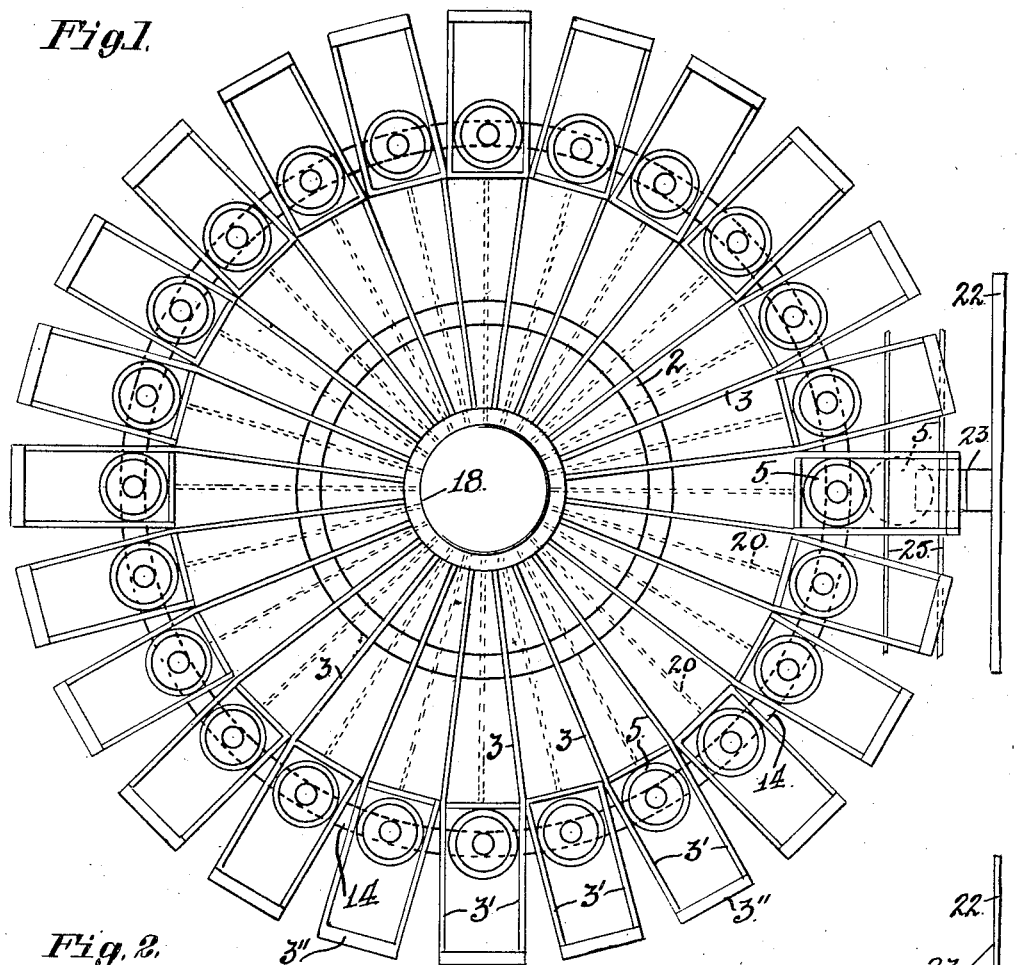
Fig. 1 is a top plan view, somewhat diagrammatic of my apparatus.
Figure 2:
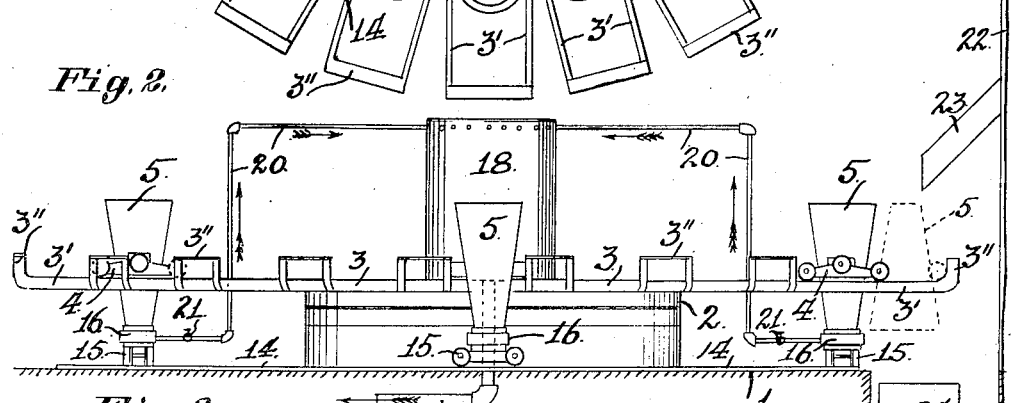
Fig. 2 is a side elevation of the same.

In Fig. 2, the numeral 1 indicates a suitable foundation, with a turn-table 2 upon which is mounted a carrier 3 comprising a plurality of radial arms, the outer ends of which are branched as seen in Fig. 1 in order to form the tracks 3', the extremities of the tracks being upturned to form stops 3''.

Upon each pair of tracks 3' is mounted a wheeled truck 4, each of which carries a distillation container 5. In its best form, for reasons which will hereinafter appear, the container 5 tapers from top to bottom so that it has a downwardly decreasing cross-sectional area.

The top of the container is open, and in its bottom it carries a grate 6 as shown in Figs. 6 and 7. The container is suitably lined as seen in Figs. 5, 6 and 7, with fire resisting material 5'.

Referring now to Figs. 4 and 5, the container on opposite sides is provided with hanger pins 7, which are journaled in eccentrics 8; the latter being journaled in boxes 9 on the truck 4, so that said container is pivotally suspended from and hangs between the sides of the truck. By reason of this mounting the container is adapted for vertical movement, due to the rocking of the eccentrics 8, and for a swinging invertible movement upon its hanger pins 7 as an axis. Levers 10 secured to the eccentrics 8 provide for rocking said eccentrics. A worm gear 11, keyed to one of the hanger pins 7 and engaged by a worm 12 operated by a handle crank 13 are here shown as indicating suitable means for inverting and righting the container.

Upon the foundation 1 is a circular track 14 as seen in Figs. 1 and 2, upon which travel wheeled trucks 15.

Figure 3:
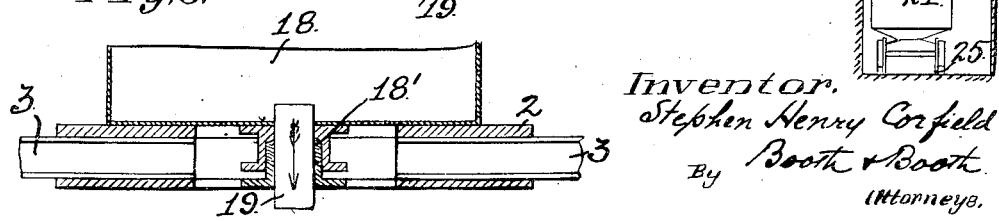
Fig. 3 is a vertical sectional detail of the exhaust pipe connection with the vacuum tank.

Each truck 15 carries a chambered member 16 having an open top. This member 16 constitutes a suction-base for the container with which it is associated. It lies directly below the grated foot of the container, and any suitable fluid-tight joint may be established between said container and base member as, for example, the liquid-seal joint shown in Fig. 7 and comprising the flange 5″ on the container, the groove 16′ in the base member and the liquid body 17 in the groove. Each chambered base has a cleanout plug 16″. Mounted upon the carrier 3 is a vacuum tank 18 with the base of which communicates by means of a suitable stuffing box 18′, Fig. 3, the exhaust pipe 19 which leads to a suitable source of suction, as for example a suction fan, not shown. From the vacuum tank 18 radiate the suction pipe lines 20, one to each chambered base member 16, and in each pipe line 20 is a controlling valve 21, Fig. 2. 22 is a loading bin and 23 its delivery chute. 24 is a discharge car on a track 25 tangential to the carrier 3. The distilling operation carried out in this apparatus is as follows.

To charge the apparatus, the distillation containers 5, disassociated from the chambered base members 16, are successively run out by their trucks 4 to the ends of the tracks 3′ where the stops 3″ limit them as shown by the dotted container at the right of Figs. 1 and 2. The containers are at this time right side up as in Fig. 1, that is, their larger ends are uppermost. As each container thus run out, is, by the rotation of the carrier 3 brought under the chute 23, as in Fig. 1, it is charged from bin 22 with the raw material, and said charged container is then rolled back with its truck 4 to its functional or inner position directly over its associated chambered base member 16, Fig. 2. The lever 10 is then operated, and by means of the eccentrics 8 said container is lowered to complete its fluid-tight communicative association with the chambered base member 16 as shown in Figs. 2, 5 and 7. The raw material is then set on fire at the top either with or without the assistance of kindling according to the nature of the material being treated; and by means of the suction fan, a current of air to support combustion is drawn down through the charge from the top to the bottom, the combustion zone thus descending and the vapors being drawn off from below, through the chambered base member 16, the vapor line 20, the vacuum tank 18, and exhaust pipe 19 to suitable condensers, or to other destinations. A second container, and a third, and so on throughout, are successively charged and ignited and moved forward in endless procession, by the rotation of the carrier.

Now when the first container, the distillation in which has been completed, reaches the point of beginning, the lever 10 of the eccentrics 8 is again operated, this time to lift the container from its association with its chambered base member 16 thereby freeing it therefrom as shown in Fig. 4. Said container is then run out with its truck 4 on the tracks 3′ to the stops 3″; and thereupon the handle-crank 13 is operated, which through the worm 12 and worm gear 11 inverts the container as shown in dotted lines on the right of Fig. 2 and thus drops the residual contents into the underlying discharge car 24, said contents consisting of whatever products remain after distillation according to the nature of the charge. The container is then uprighted, recharged with raw material, rolled back again, lowered to its association with its chambered base member, and again ignited and moved forward one step to bring the next container into position for discharge and recharging. Thus the operation proceeds continuously.

By means of the valves 21 the suction may be timely instituted and properly controlled. With raw materials which produce no valuable gases or vapors the products of combustion may be allowed to pass into the atmosphere, while in cases where the gases or vapors are of value they are collected and treated in any approved manner. It is to be especially noted that the shape of the open-top distillation containers, larger at top than at bottom, is of twofold importance, namely, first permitting easy discharge of the residual contents when the container is inverted; and second, and of still greater advantage, unless the container is smaller at the bottom than at the top, a very considerable portion of the raw material will not be thoroughly treated, whereas with the shape of container herein shown, all the material is equally and uniformly thoroughly treated or distilled.

I claim:

1. An apparatus for the distillation of materials comprising a distillation container having an open top and a grated bottom; an independent chambered base member; a truck supporting said container and adapted to move it into and out of vertical alignment with the chambered base member; means for lifting and lowering said container from and into communicative association with said chambered base member; means for pivotally suspending said container upon the truck adapting it for inversion when lifted from its communication with the chambered base member and moved away therefrom; and means for applying suction to said chambered base member.

2. An apparatus for the distillation of materials comprising a distillation container having an open top and a grated bottom and provided with side hangers; a truck in which the container is pivotally invertibly suspended by its hangers, and is adapted to be moved into and out of charging and functioning positions; a chambered base member underlying the container; eccentrics associated with said container hangers for lifting and lowering said container from and into association with said chambered base member; and means for applying suction to said base member.

3. An apparatus for the distillation of materials comprising a distillation container having an open top and a grated bottom and provided with side hangers; a truck in which the container is pivotally invertibly suspended by its hangers, and is adapted to be moved into and out of charging and functioning positions; a chambered base member underlying the container; eccentrics associated with said container hangers for lifting and lowering said container from and into communicative association with said chambered base member; means for applying suction to said base member; and operating connections associated with said container hangers for inverting the container when free from its base member.

4. An apparatus for the distillation of materials comprising a distillation container having an open top and a grated bottom, said container diminishing in cross sectional area from top to bottom; means adapting said container to be moved into and out of charging and functioning positions; a chambered base member underlying the container; means for lifting and lowering said container from and into communicative association with said chambered base member; means for applying suction to said base member; and means for inverting said container when free from said base member.

5. An apparatus for the distillation of materials comprising a rotatable carrier; a plurality of invertibly suspended distillation containers with open tops and grated bottoms, independently mounted upon said carrier adapting them to be severally moved into and out of charging and functioning positions; a plurality of chambered base members one for and underlying each container and rotatably movable with said carrier; means for lifting and lowering each container from and into communicative association with its chambered base member; means for applying suction to each base member; and means for inverting each container when freed from its base member.

6. An apparatus for the distillation of materials comprising a rotatable carrier; a plurality of invertibly suspended distillation containers with open tops and grated bottoms, independently mounted upon said carrier adapting them to be severally moved into and out of charging and functioning positions; a plurality of chambered base members one for and underlying each container and rotatably movable with said carrier; means for lifting and lowering each container from and into communicative association with its chambered base member; a vacuum tank mounted upon said carrier; means for establishing suction in said tank; suction pipes leading from said tank to said chambered base members; and means for inverting each container when freed from its base member.

7. An apparatus for the distillation of materials comprising a rotatable carrier; a plurality of invertibly suspended distillation containers with open tops and grated bottoms, independently mounted upon said carrier adapting them to be severally moved into and out of charging and functioning positions; a plurality of chambered base members one for and underlying each container and rotatably movable with said carrier; means for lifting and lowering each container from and into communicative association with its chambered base member; a vacuum tank mounted upon said carrier; means for establishing suction in said tank; suction pipes leading from said tank to said chambered base members; controlling valves in said suction pipes; and means for inverting each container when freed from its base member.

8. An apparatus for the distillation of materials comprising a rotatable carrier with a plurality of radial arms having tracks; a truck mounted upon each track; a distillation container invertibly suspended upon each truck and adapted to be moved therewith into and out of charging and functioning positions; a chambered base member for each container; a traveling truck for each base member; means for lifting and lowering each container from and into communicative association with its base member; a vacuum tank mounted upon said carrier; means for establishing suction in said tank; suction pipes leading from said tank to said chambered base members; and means for inverting each container when freed from its base member.

In testimony whereof I have signed my name to this specification.

STEPHEN HENRY CORFIELD.